United States Patent
Yang et al.

(10) Patent No.: US 10,530,596 B2
(45) Date of Patent: Jan. 7, 2020

(54) METHOD FOR SETTING PACKET TRANSMISSION MODE AND DEVICE

(71) Applicant: Huawei Technologies Co., Ltd., Shenzhen (CN)

(72) Inventors: Ya Yang, Suzhou (CN); Lin Zhang, Suzhou (CN); Yongxing Chen, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/704,302

(22) Filed: Sep. 14, 2017

(65) Prior Publication Data

US 2018/0076967 A1    Mar. 15, 2018

(30) Foreign Application Priority Data

Sep. 14, 2016   (CN) .......................... 2016 1 0822724

(51) Int. Cl.
| | |
|---|---|
| *H04L 12/18* | (2006.01) |
| *H04L 12/801* | (2013.01) |
| *H04L 12/835* | (2013.01) |
| *H04W 84/12* | (2009.01) |
| *H04W 88/08* | (2009.01) |

(52) U.S. Cl.
CPC .......... *H04L 12/189* (2013.01); *H04L 12/185* (2013.01); *H04L 12/1877* (2013.01); *H04L 47/15* (2013.01); *H04L 47/30* (2013.01); *H04W 84/12* (2013.01); *H04W 88/08* (2013.01)

(58) Field of Classification Search
CPC .. H04N 21/6405; H04N 21/6408; H04W 4/06
See application file for complete search history.

(56) References Cited

U.S. PATENT DOCUMENTS

| | | | |
|---|---|---|---|
| 2009/0019509 A1 | 1/2009 | Horn et al. | |
| 2010/0165902 A1* | 7/2010 | Kvernvik | H04L 12/189 370/312 |
| 2011/0228769 A1 | 9/2011 | Haimi-Cohen et al. | |

(Continued)

FOREIGN PATENT DOCUMENTS

| | | |
|---|---|---|
| CN | 101326790 A | 12/2008 |
| CN | 101827306 A | 9/2010 |

(Continued)

OTHER PUBLICATIONS

Machine Translation and Abstract of Japanese Publication No. JP2007060197, Mar. 8, 2007, 12 pages.
Foreign Communication From A Counterpart Application, European Application No. 17191136.5, Extended European Search Report dated Jan. 12, 2018, 9 pages.
Machine Translation and Abstract of Chinese Publication No. CN101827306, Sep. 8, 2010, 13 pages.

(Continued)

*Primary Examiner* — Shukri Taha
(74) *Attorney, Agent, or Firm* — Conley Rose, P.C.

(57) ABSTRACT

A method for setting a packet transmission mode and a device are provided, and relate to the communications field. To optimize sending of a multicast packet, both robustness and resource consumption are considered. A specific solution is as follows: when a packet amount in a packet cache queue exceeds a first threshold, changing a state of a first multicast group to multicast transmission, where a state that is of the first multicast group and that is before the change is multicast-to-unicast transmission. Technical solutions of this disclosure are used for setting a packet transmission mode.

12 Claims, 1 Drawing Sheet

(56) References Cited

U.S. PATENT DOCUMENTS

| | | | | |
|---|---|---|---|---|
| 2015/0009821 | A1* | 1/2015 | Sridhar | H04L 12/189 |
| | | | | 370/235 |
| 2015/0188836 | A1* | 7/2015 | Liu | H04L 47/621 |
| | | | | 370/235.1 |
| 2016/0080446 | A1* | 3/2016 | Karthikeyan | H04L 65/4076 |
| | | | | 709/219 |

FOREIGN PATENT DOCUMENTS

| | | | |
|---|---|---|---|
| CN | 101883400 | A | 11/2010 |
| CN | 102300168 | A | 12/2011 |
| CN | 102316419 | A | 1/2012 |
| CN | 102845020 | A | 12/2012 |
| CN | 104104481 | A | 10/2014 |
| CN | 105075218 | A | 11/2015 |
| JP | 2007060197 | A | 3/2007 |
| WO | 2006091736 | A2 | 8/2006 |

OTHER PUBLICATIONS

Machine Translation and Abstract of Chinese Publication No. CN101883400, Nov. 10, 2010, 7 pages.
Machine Translation and Abstract of Chinese Publication No. CN102300168, Dec. 28, 2011, 11 pages.
Machine Translation and Abstract of Chinese Publication No. CN102316419, Jan. 11, 2012, 10 pages.
Machine Translation and Abstract of Chinese Publication No. CN102845020, Dec. 26, 2012, 18 pages.
Machine Translation and Abstract of Chinese Publication No. CN104104481, Oct. 15, 2014, 19 pages.
Machine Translation and Abstract of Chinese Publication No. CN105075218, Nov. 18, 2015, 27 pages.
Foreign Communication From A Counterpart Application, Chinese Application No. 201610822724.3, Chinese Office Action dated Sep. 29, 2019, 9 pages.

* cited by examiner

When a packet amount in a packet cache queue exceeds a first threshold, an AP changes a state of a first multicast group to multicast transmission — 101

METHOD FOR SETTING PACKET TRANSMISSION MODE AND DEVICE

CROSS-REFERENCE TO RELATED APPLICATIONS

This application claims priority to Chinese Patent Application No. 201610822724.3, filed on Sep. 14, 2016, which is hereby incorporated by reference in its entirety.

TECHNICAL FIELD

This disclosure relates to the communications field, and in particular, to a method for setting a packet transmission mode and a device.

BACKGROUND

In a wireless local area network (WLAN), an access point (AP) may send a unicast packet or a multicast packet to a terminal. The unicast packet is a packet that is in WLAN format and whose receiver address (RA) is a unicast medium access control (MAC) address. The multicast packet is a packet that is in WLAN format and whose RA is a multicast MAC address. There is no retransmission mechanism for the multicast packet. When a network condition is poor, the multicast packet may be easily lost. To reduce a loss of the multicast packet, the AP may convert the multicast packet into multiple unicast packets, and separately send the multiple unicast packets. There is a retransmission mechanism for the unicast packet, and the unicast packet may not be easily lost. However, each of the multiple unicast packets is independently sent, and a relatively large quantity of resources are consumed.

SUMMARY

To optimize sending of a multicast packet and take both robustness and resource consumption into consideration, this application provides a method for setting a packet transmission mode and a device. The technical solutions are as follows.

According to a first aspect, a method for setting a packet transmission mode is provided, where the method includes, when a packet amount in a packet cache queue exceeds a first threshold, changing, by an AP, a state of a first multicast group to multicast transmission, where a state that is of the first multicast group and that is before the change is multicast-to-unicast transmission.

For a multicast group whose state is multicast-to-unicast transmission, an AP needs to replicate a packet to obtain multiple packets, and a large quantity of central processing unit (CPU) resources are consumed. The AP needs to separately send the multiple replicated packets to multiple terminals in the multicast group, and a large quantity of air interface resources are consumed. In multicast-to-unicast transmission mode, efficiency of sending a packet is relatively low, and a relatively large quantity of resources are consumed. In multicast transmission mode, the packet may be easily lost, and transmission quality is relatively low. When a quantity of packets in a packet cache queue is relatively large, one of multiple multicast groups whose original states are multicast-to-unicast transmission is set to multicast transmission. This can improve packet transmission efficiency while ensuring packet transmission quality.

In a possible implementation, before the changing, by an AP, a state of a first multicast group to multicast transmission, the first multicast group is one of multiple multicast groups, and states of the multiple multicast groups are multicast-to-unicast transmission.

In a possible implementation, after the changing, by an AP, a state of a first multicast group in a first set to multicast transmission, the method further includes receiving, by the AP, a first multicast packet, where a multicast group of the first multicast packet is the first multicast group; adding, by the AP, the first multicast packet to the packet cache queue; and sending, by the AP, the first multicast packet in the packet cache queue.

In a possible implementation, after the packet amount in the packet cache queue exceeds the first threshold, the method further includes, when receiving a second multicast packet in the first multicast group, adding, by the AP, the second multicast packet to a temporary queue of the first multicast group; and when a quantity of packets in the first multicast group that are in the packet cache queue is 0, adding, by the AP, the second multicast packet in the temporary queue of the first multicast group to the packet cache queue according to the state of the first multicast group.

If there is a to-be-sent multicast-to-unicast packet in the first multicast group, in this case, the second multicast packet is sent in multicast transmission mode, and packet disordering may easily occur. Therefore, before the second multicast packet is added to the packet cache queue, it is required to determine that the quantity of the packets in the first multicast group that are in the packet cache queue is 0.

In a possible implementation, before the packet amount in the packet cache queue exceeds the first threshold, the method further includes receiving, by the AP, a third multicast packet, where a multicast group of the third multicast packet is the first multicast group; converting, by the AP, the third multicast packet into one or more unicast packets according to the state of the first multicast group, where a receiver address or receiver addresses of the one or more unicast packets is/are a MAC address or MAC addresses of one or more terminals in the first multicast group; adding, by the AP, the one or more unicast packets to the packet cache queue; and sending, by the AP, the one or more unicast packets in the packet cache queue.

In a possible implementation, the first multicast group is a multicast group that has a smallest quantity of terminals and that is in the multiple multicast groups whose states are multicast-to-unicast transmission.

In multicast-to-unicast transmission mode, a packet may not be easily lost, and packet transmission quality is relatively high. Therefore, when a multicast group whose original state is multicast-to-unicast transmission is set to multicast transmission, a multicast group that has a relatively small quantity of terminals is preferentially selected. This can ensure that a quantity of terminals in the multicast group whose state is multicast-to-unicast transmission is not significantly reduced, and overall packet transmission quality is relatively high.

In a possible implementation, the first multicast group is a multicast group that has a largest quantity of terminals and that is in the multiple multicast groups whose states are multicast-to-unicast transmission.

Compared with multicast-to-unicast transmission, efficiency of multicast transmission is higher. When a quantity of packets in a packet cache queue is relatively large, a multicast group that has a relatively large quantity of terminals is preferentially selected, and a state of the multicast group is changed from multicast-to-unicast transmission to multicast transmission. This can quickly improve packet transmission efficiency.

In a possible implementation, the method further includes, when the packet amount in the packet cache queue is less than a second threshold, changing, by the AP, a state of a second multicast group to multicast-to-unicast transmission, where a state that is of the second multicast group and that is before the change is multicast transmission.

For a multicast group whose state is multicast transmission, a packet may be easily lost during transmission, and transmission quality is relatively low. In multicast-to-unicast transmission mode, a relatively large quantity of CPU resources and air interface resources are consumed. If a quantity of packets in a packet cache queue is relatively small, it indicates that a relatively small quantity of CPU resources and air interface resources are consumed, and a second multicast group whose original state is multicast transmission is set to multicast-to-unicast transmission. This can improve packet transmission quality while ensuring packet transmission efficiency.

In a possible implementation, before the changing, by the AP, a state of a second multicast group to multicast-to-unicast transmission, the second multicast group is one of multiple multicast groups, and states of the multiple multicast groups are multicast transmission.

In a possible implementation, after the changing, by the AP, a state of a second multicast group to multicast-to-unicast transmission, the method further includes receiving, by the AP, a fourth multicast packet, where a multicast group of the fourth multicast packet is the second multicast group; converting, by the AP, the fourth multicast packet into one or more unicast packets according to the state of the second multicast group, where a receiver address or receiver addresses of the one or more unicast packets is/are a MAC address or MAC addresses of one or more terminals in the second multicast group; adding, by the AP, the one or more unicast packets to the packet cache queue; and sending, by the AP, the one or more unicast packets in the packet cache queue.

In a possible implementation, after the packet amount in the packet cache queue is less than the second threshold, the method further includes, when receiving a fifth multicast packet in the second multicast group, converting, by the AP, the fifth multicast packet into one or more unicast packets, where a receiver address or receiver addresses of the one or more unicast packets is/are a MAC address or MAC addresses of one or more terminals in the second multicast group, and adding the fifth multicast packet to a temporary queue of the second multicast group; and when a quantity of packets in the second multicast group that are in the packet cache queue is 0, adding, by the AP, the fifth multicast packet in the temporary queue of the second multicast group to the packet cache queue according to the state of the second multicast group; or when receiving a fifth multicast packet in the second multicast group, adding, by the AP, the fifth multicast packet to a temporary queue of the second multicast group; and when a quantity of packets in the second multicast group that are in the packet cache queue is 0, converting, by the AP, the fifth multicast packet in the temporary queue of the second multicast group into one or more unicast packets according to the state of the second multicast group, where a receiver address or receiver addresses of the one or more unicast packets is/are a MAC address or MAC addresses of one or more terminals in the second multicast group, and adding the one or more unicast packets to the packet cache queue.

If there is a to-be-sent multicast packet in the second multicast group, in this case, the fifth multicast packet is sent in multicast-to-unicast transmission mode, and packet disordering may easily occur. Therefore, before the fifth multicast packet is added to the packet cache queue, it is required to determine that the quantity of the packets in the second multicast group that are in the packet cache queue is 0.

In a possible implementation, before the changing, by the AP, a state of a second multicast group to multicast-to-unicast transmission, the second multicast group is one of multiple multicast groups, and states of the multiple multicast groups are multicast transmission.

In a possible implementation, before the packet amount in the packet cache queue is less than the second threshold, the method further includes receiving, by the AP, a sixth multicast packet, where a multicast group of the sixth multicast packet is the second multicast group; adding, by the AP, the sixth multicast packet to the packet cache queue; and sending, by the AP, the sixth multicast packet in the packet cache queue.

In a possible implementation, the second multicast group is a multicast group that has a largest quantity of terminals and that is in multiple multicast groups whose states are multicast transmission.

In multicast-to-unicast transmission mode, a packet may not be easily lost, and packet transmission quality is relatively high. Therefore, when a multicast group whose original state is multicast transmission is set to multicast-to-unicast transmission, a multicast group that has a relatively large quantity of terminals is preferentially selected. This can ensure that a quantity of terminals in a multicast group whose state is multicast-to-unicast transmission significantly increases, overall packet transmission quality is greatly improved, and user experience is improved.

In a possible implementation, the second multicast group is a multicast group that has a smallest quantity of terminals and that is in multiple multicast groups whose states are multicast transmission.

Compared with multicast-to-unicast transmission, efficiency of multicast transmission is higher. When a multicast group whose original state is multicast transmission is set to multicast-to-unicast transmission, a multicast group that has a relatively small quantity of terminals is preferentially selected. This can improve packet transmission quality while ensuring that packet transmission efficiency is relatively high.

According to a second aspect, an AP is provided, where the AP includes a processing unit configured to, when a packet amount in a packet cache queue exceeds a first threshold, change a state of a first multicast group to multicast transmission, where a state that is of the first multicast group and that is before the change is multicast-to-unicast transmission.

In a possible implementation, before the AP changes the state of the first multicast group to multicast transmission, the first multicast group is one of multiple multicast groups, and states of the multiple multicast groups are multicast-to-unicast transmission.

In a possible implementation, the AP further includes a transceiver unit configured to receive a first multicast packet, where a multicast group of the first multicast packet is the first multicast group; the processing unit is further configured to add the first multicast packet to the packet cache queue; and the transceiver unit is further configured to send the first multicast packet in the packet cache queue.

In a possible implementation, the processing unit is further configured to, when a second multicast packet in the first multicast group is received, add the second multicast packet to a temporary queue of the first multicast group; and when a quantity of packets in the first multicast group that are in the packet cache queue is 0, add the second multicast packet in the temporary queue of the first multicast group to the packet cache queue according to the state of the first multicast group.

In a possible implementation, the AP further includes a transceiver unit configured to receive a third multicast packet, where a multicast group of the third multicast packet is the first multicast group; the processing unit is further configured to convert the third multicast packet into one or more unicast packets according to the state of the first multicast group, where a receiver address or receiver addresses of the one or more unicast packets is/are a MAC address or MAC addresses of one or more terminals in the first multicast group; and add the one or more unicast packets to the packet cache queue; and the transceiver unit is further configured to send the one or more unicast packets in the packet cache queue.

In a possible implementation, the first multicast group is a multicast group that has a smallest quantity of terminals and that is in the multiple multicast groups whose states are multicast-to-unicast transmission.

In a possible implementation, the first multicast group is a multicast group that has a largest quantity of terminals and that is in the multiple multicast groups whose states are multicast-to-unicast transmission.

In a possible implementation, the processing unit is further configured to, when the packet amount in the packet cache queue is less than a second threshold, change a state of a second multicast group to multicast-to-unicast transmission, where a state that is of the second multicast group and that is before the change is multicast transmission.

In a possible implementation, before the AP changes the state of the second multicast group to multicast-to-unicast transmission, the second multicast group is one of multiple multicast groups, and states of the multiple multicast groups are multicast transmission.

In a possible implementation, the AP further includes a transceiver unit configured to receive a fourth multicast packet, where a multicast group of the fourth multicast packet is the second multicast group; the processing unit is further configured to convert the fourth multicast packet into one or more unicast packets according to the state of the second multicast group, where a receiver address or receiver addresses of the one or more unicast packets is/are a MAC address or MAC addresses of one or more terminals in the second multicast group; and add the one or more unicast packets to the packet cache queue; and the transceiver unit is further configured to send the one or more unicast packets in the packet cache queue.

In a possible implementation, the processing unit is further configured to, when a fifth multicast packet in the second multicast group is received, convert the fifth multicast packet into one or more unicast packets, where a receiver address or receiver addresses of the one or more unicast packets is/are a MAC address or MAC addresses of one or more terminals in the second multicast group, and add the fifth multicast packet to a temporary queue of the second multicast group; and when a quantity of packets in the second multicast group that are in the packet cache queue is 0, add the fifth multicast packet in the temporary queue of the second multicast group to the packet cache queue according to the state of the second multicast group; or the processing unit is further configured to, when a fifth multicast packet in the second multicast group is received, add the fifth multicast packet to a temporary queue of the second multicast group; and when a quantity of packets in the second multicast group that are in the packet cache queue is 0, convert the fifth multicast packet in the temporary queue of the second multicast group into one or more unicast packets according to the state of the second multicast group, where a receiver address or receiver addresses of the one or more unicast packets is/are a MAC address or MAC addresses of one or more terminals in the second multicast group, and add the one or more unicast packets to the packet cache queue.

In a possible implementation, the AP further includes a transceiver unit configured to receive a sixth multicast packet, where a multicast group of the sixth multicast packet is the second multicast group; the processing unit is further configured to add the sixth multicast packet to the packet cache queue; and the transceiver unit is further configured to send the sixth multicast packet in the packet cache queue.

In a possible implementation, the second multicast group is a multicast group that has a largest quantity of terminals and that is in multiple multicast groups whose states are multicast transmission.

In a possible implementation, the second multicast group is a multicast group that has a smallest quantity of terminals and that is in multiple multicast groups whose states are multicast transmission.

According to a third aspect, an AP is provided, where the AP includes a processor and an antenna, the processor is connected to the antenna, and the antenna is configured to send and receive signals; and the processor is configured to, when a packet amount in a packet cache queue exceeds a first threshold, change a state of a first multicast group to multicast transmission, where a state that is of the first multicast group and that is before the change is multicast-to-unicast transmission.

In a possible implementation, before the AP changes the state of the first multicast group to multicast transmission, the first multicast group is one of multiple multicast groups, and states of the multiple multicast groups are multicast-to-unicast transmission.

In a possible implementation, the processor is further configured to receive a first multicast packet using the antenna, where a multicast group of the first multicast packet is the first multicast group; add the first multicast packet to the packet cache queue; and send the first multicast packet in the packet cache queue using the antenna.

In a possible implementation, the processor is further configured to, when receiving a second multicast packet in the first multicast group, add the second multicast packet to a temporary queue of the first multicast group; and when a quantity of packets in the first multicast group that are in the packet cache queue is 0, add the second multicast packet in the temporary queue of the first multicast group to the packet cache queue according to the state of the first multicast group.

In a possible implementation, the processor is further configured to receive a third multicast packet using the antenna, where a multicast group of the third multicast packet is the first multicast group; convert the third multicast packet into one or more unicast packets according to the state of the first multicast group, where a receiver address or receiver addresses of the one or more unicast packets is/are a MAC address or MAC addresses of one or more terminals in the first multicast group; add the one or more unicast packets to the packet cache queue; and send the one or more unicast packets in the packet cache queue using the antenna.

In a possible implementation, the first multicast group is a multicast group that has a smallest quantity of terminals and that is in the multiple multicast groups whose states are multicast-to-unicast transmission.

In a possible implementation, the first multicast group is a multicast group that has a largest quantity of terminals and that is in the multiple multicast groups whose states are multicast-to-unicast transmission.

In a possible implementation, the processor is further configured to, when the packet amount in the packet cache queue is less than a second threshold, change a state of a second multicast group to multicast-to-unicast transmission, where a state that is of the second multicast group and that is before the change is multicast transmission.

In a possible implementation, before the AP changes the state of the second multicast group to multicast-to-unicast transmission, the second multicast group is one of multiple multicast groups, and states of the multiple multicast groups are multicast transmission.

In a possible implementation, the processor is further configured to receive a fourth multicast packet using the antenna, where a multicast group of the fourth multicast packet is the second multicast group; convert the fourth multicast packet into one or more unicast packets according to the state of the second multicast group, where a receiver address or receiver addresses of the one or more unicast packets is/are a MAC address or MAC addresses of one or more terminals in the second multicast group; add the one or more unicast packets to the packet cache queue; and send the one or more unicast packets in the packet cache queue using the antenna.

In a possible implementation, the processor is further configured to, when receiving a fifth multicast packet in the second multicast group, convert the fifth multicast packet into one or more unicast packets, where a receiver address or receiver addresses of the one or more unicast packets is/are a MAC address or MAC addresses of one or more terminals in the second multicast group, and add the fifth multicast packet to a temporary queue of the second multicast group; and when a quantity of packets in the second multicast group that are in the packet cache queue is 0, add the fifth multicast packet in the temporary queue of the second multicast group to the packet cache queue according to the state of the second multicast group; or the processor is further configured to, when receiving a fifth multicast packet in the second multicast group, add the fifth multicast packet to a temporary queue of the second multicast group; and when a quantity of packets in the second multicast group that are in the packet cache queue is 0, convert the fifth multicast packet in the temporary queue of the second multicast group into one or more unicast packets according to the state of the second multicast group, where a receiver address or receiver addresses of the one or more unicast packets is/are a MAC address or MAC addresses of one or more terminals in the second multicast group, and add the one or more unicast packets to the packet cache queue.

In a possible implementation, the processor is further configured to receive a sixth multicast packet using the antenna, where a multicast group of the sixth multicast packet is the second multicast group; add the sixth multicast packet to the packet cache queue; and send the sixth multicast packet in the packet cache queue using the antenna.

In a possible implementation, the second multicast group is a multicast group that has a largest quantity of terminals and that is in multiple multicast groups whose states are multicast transmission.

In a possible implementation, the second multicast group is a multicast group that has a smallest quantity of terminals and that is in multiple multicast groups whose states are multicast transmission.

According to a fourth aspect, a readable storage medium is provided, where the readable storage medium is configured to implement a method for setting a packet transmission mode provided in this disclosure. The readable storage medium may be a random access memory (RAM), a read-only memory (ROM), a flash memory, or another storage device.

BRIEF DESCRIPTION OF DRAWINGS

To describe the technical solutions in the embodiments of this disclosure more clearly, the following briefly describes the accompanying drawings required for describing the embodiments. The accompanying drawings in the following description show merely some embodiments of this disclosure, and a person of ordinary skill in the art may still derive other drawings from these accompanying drawings without creative efforts.

DESCRIPTION OF EMBODIMENTS

To make the objectives, technical solutions, and advantages of this disclosure clearer, the following further describes the implementations of this disclosure in detail with reference to the accompanying drawings.

Figure 1:
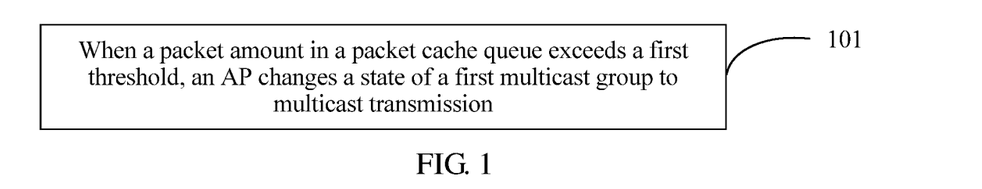
FIG. 1 is a schematic flowchart of a method for setting a packet transmission mode according to an embodiment of this disclosure.

An embodiment of this disclosure provides a method for setting a packet transmission mode. As shown in FIG. 1, the method includes the following step.

101. When a packet amount in a packet cache queue exceeds a first threshold, an AP changes a state of a first multicast group to multicast transmission.

A state that is of the first multicast group and that is before the change is multicast-to-unicast transmission.

Optionally, the packet cache queue includes at least one to-be-sent packet. The packet amount in the packet cache queue may be a quantity of packets in the packet cache queue, or may be a data amount of packets in the packet cache queue.

Optionally, before a packet enters the packet cache queue, the AP converts the packet into a packet in WLAN format, or after a packet enters the packet cache queue, the AP converts the packet into a packet in WLAN format before sending the packet.

In a first application scenario, the packet cache queue includes a cache queue of multicast packets and a cache queue of unicast packets. A to-be-sent multicast packet and a to-be-sent unicast packet are stored in two different queues. Both queues are packet cache queues. Alternatively, to-be-sent multicast packets are stored in multiple cache queues, and to-be-sent unicast packets are stored in the multiple cache queues.

In a second application scenario, the to-be-sent multicast packet and the to-be-sent unicast packet are stored in a single packet cache queue.

In the foregoing two application scenarios, the packet amount in the packet cache queue refers to a sum of a quantity of the to-be-sent multicast packets and a quantity of the to-be-sent unicast packets. The multicast packet may be converted into one or more unicast packets, and a unicast packet obtained by converting the multicast packet may also be referred to as a multicast-to-unicast packet. The multicast-to-unicast packet is transmitted in the same mode as the unicast packet received by the AP. If the multicast packet and the unicast packet are stored in different queues, the multicast-to-unicast packet and the unicast packet are in a same cache queue.

The second application scenario is used as an example. The to-be-sent multicast packet and the to-be-sent multicast-to-unicast packet are cached in a queue. When the AP receives the multicast packet, if a state of a multicast group of the multicast packet is multicast transmission, the packet is converted into a packet in WLAN format to be added to the packet cache queue, or after the packet is added to the packet cache queue, the packet is converted into a packet in WLAN format before the packet is sent. If a state of a multicast group of the multicast packet is multicast-to-unicast transmission, the AP obtains MAC addresses of all terminals in the multicast group of the multicast packet. The AP replicates the multicast packet to obtain multiple multicast packets. The AP changes a destination MAC address of each multicast packet obtained by means of replication to a MAC address of one of all the terminals in the multicast group, so as to generate the unicast packet that is to be sent to each terminal. The AP converts a unicast packet that is after the change into a packet in WLAN format, and adds the unicast packet to the packet cache queue; or after adding a unicast packet that is after the change to the packet cache queue, the AP converts the unicast packet into a packet in WLAN format before sending the unicast packet. A specific quantity of unicast packets that are generated is equal to a specific quantity of terminals that are in the multicast group corresponding to the multicast packet. A MAC address of a terminal in a multicast group may be determined by means of Internet Group Management Protocol (IGMP) snooping. When a terminal needs to obtain data of a multicast group, the terminal sends an IGMP request to the AP, where the request includes an address of the multicast group. The terminal that requests the data of the multicast group is a terminal in the multicast group.

Optionally, that the packet amount in the packet cache queue exceeds the first threshold may be that the packet amount is greater than the first threshold, or the packet amount is greater than or equal to the first threshold.

When the packet amount in the packet cache queue exceeds the first threshold, changing the state of the first multicast group to multicast transmission may be that once the packet amount in the packet cache queue exceeds the first threshold, the state of the first multicast group is changed, or when the packet amount in the packet cache queue continuously exceeds the first threshold, the state of the first multicast group is changed.

For example, when the packet amount in the packet cache queue continuously exceeds the first threshold for first duration, the AP changes the state of the first multicast group to multicast transmission in multiple multicast groups whose states are multicast-to-unicast transmission.

For example, the first duration may be one second, and the first threshold may be 0.5 times a maximum queue length.

The packet amount in the packet cache queue is measured in the quantity of packets. When a new to-be-sent packet is added, the quantity of packets in the packet cache queue increases. When the to-be-sent packet is sent, the quantity of the packets in the packet cache queue decreases. Optionally, when the quantity of the packets in the packet cache queue changes, the quantity of the packets in the packet cache queue is obtained. When the quantity of the packets in the packet cache queue is greater than or equal to the first threshold, a timer is set to 0 and starts timing. If the quantity of the packets at a specific moment is less than the first threshold, the timer is cleared to 0. If the obtained quantity of the packets in the packet cache queue is greater than or equal to the first threshold, and a time value of the timer is greater than or equal to one second (that is, the first duration), a packet transmission mode of the first multicast group is set to multicast transmission.

For a multicast group whose state is multicast-to-unicast transmission, an AP needs to replicate a packet to obtain multiple packets, and a relatively large quantity of CPU resources are consumed. In addition, the AP needs to separately send the multiple replicated packets to multiple terminals in the multicast group, and a relatively large quantity of air interface resources are further consumed. In multicast-to-unicast transmission mode, efficiency of sending a packet is relatively low, and a relatively large quantity of resources are consumed. In multicast transmission mode, the packet may be easily lost, and transmission quality is relatively low. When a quantity of packets in a packet cache queue is relatively large, a first multicast group whose original state is multicast-to-unicast transmission is set to multicast transmission. This can improve packet transmission efficiency while ensuring packet transmission quality.

Optionally, after the AP changes the state of the first multicast group in a first set to multicast transmission, the AP receives a first multicast packet, where a multicast group of the first multicast packet is the first multicast group; the AP adds the first multicast packet to the packet cache queue; and the AP sends the first multicast packet in the packet cache queue. Optionally, the AP may convert the first multicast packet into a packet in WLAN format according to the state of the first multicast group, and add the first multicast packet obtained after format conversion to the packet cache queue; or after adding the first multicast packet to the packet cache queue, the AP may convert the first multicast packet into a packet in WLAN format according to the state of the first multicast group before sending the first multicast packet. A receiver address of the first multicast packet in WLAN format is a multicast MAC address of the first multicast group. The AP performs scheduling on the packet cache queue according to a rule. When the first multicast packet is selected using the scheduling rule, the AP sends the first multicast packet in the packet cache queue. After the first multicast packet is sent, the first multicast packet leaves the packet cache queue.

If to-be-sent multicast packets and to-be-sent unicast packets are in different cache queues, the AP performs scheduling on these cache queues according to a rule. The AP may first send a packet in a cache queue that stores the multicast packets, or may first send a packet in a cache queue that stores the unicast packets. For example, if the AP first receives a unicast packet, and then receives a multicast packet, the unicast packet and the multicast packet respectively enter the cache queue of unicast packets and the cache queue of multicast packets. Optionally, a multicast packet in the cache queue of multicast packets may be first sent, and then a unicast packet in the cache queue of unicast packets may be sent. Generally, for a terminal, a unicast packet and a multicast packet belong to different streams, and either the unicast packet or the multicast packet may be first received. However, if the cache queue of unicast packets includes a to-be-sent multicast-to-unicast packet in the first multicast group, a received multicast packet in the first multicast group is added to the cache queue of multicast packets according to a changed state (multicast transmission) of the first multicast group, so that the multicast packet that is in the first multicast group and that is later received may be first sent, and then the multicast-to-unicast packet obtained by converting a multicast packet that is in the first multicast group and that is first received may be sent. The multicast packet and the multicast-to-unicast packet in the first multicast group that are received by the terminal belong to a same stream. Packet disordering in the same stream may lead to an error.

To resolve a problem of packet disordering, after the packet amount in the packet cache queue exceeds the first threshold, optionally, when receiving a second multicast packet in the first multicast group, the AP adds the second multicast packet to a temporary queue of the first multicast group; and when a quantity of packets in the first multicast group that are in the packet cache queue is 0, the AP adds the second multicast packet in the temporary queue of the first multicast group to the packet cache queue according to the state of the first multicast group.

Optionally, after the packet amount in the packet cache queue exceeds the first threshold, the AP changes the state of the first multicast group to multicast transmission. If the quantity of the packets in the first multicast group that are in the packet cache queue is 0, the AP may directly add the multicast packet in the first multicast group to the packet cache queue; or if the quantity of the packets in the first multicast group that are in the packet cache queue is not 0, that is, there is a to-be-sent multicast-to-unicast packet in the first multicast group, the AP may cache, in the temporary queue of the first multicast group, the received multicast packet in the first multicast group. A packet in the temporary queue of the first multicast group is not sent, and the packet is sent after the packet is added to the packet cache queue. After sending of the multicast-to-unicast packet in the first multicast group is complete, the multicast packet that is in the first multicast group and that is cached in the temporary queue of the first multicast group is added to the packet cache queue to be sent in multicast transmission mode. Then, after receiving the multicast packet in the first multicast group, the AP can directly add the multicast packet to the packet cache queue. The multicast packet in the first multicast group is a packet that is in the first multicast group and that needs to be sent in multicast transmission mode, and the multicast-to-unicast packet in the first multicast group is a packet that is in the first multicast group and that needs to be sent in multicast-to-unicast transmission mode.

For example, a quantity of to-be-sent packets in each multicast group may be recorded, and an initial value of the quantity of the to-be-sent packets in each multicast group is 0. For the first multicast group, when a new packet is cached, that is, when a packet in the first multicast group enters the packet cache queue, a quantity of to-be-sent packets in the first multicast group increases by 1; or when a to-be-sent packet in the first multicast group is sent, that is, when a packet in the first multicast group leaves the packet cache queue, a quantity of to-be-sent packets in the first multicast group decreases by 1.

A multicast group to which the multicast packet received by the AP belongs may be determined based on an address of the multicast group of the multicast packet. The address of the multicast group may be an Internet Protocol (IP) address of the multicast group, a MAC address of the multicast group, or a combination thereof. Alternatively, the AP may identify, based on a combination of the address of the multicast group and an identifier of a virtual local area network (VLAN), the multicast group to which the multicast packet belongs.

When there is a to-be-sent multicast-to-unicast packet in a first multicast group, the AP adds a received multicast packet in the first multicast group to a temporary queue instead of a packet cache queue. After sending of the multicast-to-unicast packet in the first multicast group is complete, the multicast packet in the first multicast group is added to the packet cache queue. This avoids packet disordering.

In a possible implementation, before the packet amount in the packet cache queue exceeds the first threshold, the method further includes receiving, by the AP, a third multicast packet, where a multicast group of the third multicast packet is the first multicast group; converting, by the AP, the third multicast packet into one or more unicast packets according to the state of the first multicast group, where a receiver address or receiver addresses of the one or more unicast packets is/are a MAC address or MAC addresses of one or more terminals in the first multicast group; adding, by the AP, the one or more unicast packets to the packet cache queue; and sending, by the AP, the one or more unicast packets in the packet cache queue.

In a possible implementation, before the changing, by an AP, a state of a first multicast group to multicast transmission, the first multicast group is one of multiple multicast groups, and states of the multiple multicast groups are multicast-to-unicast transmission.

Optionally, the first multicast group is a multicast group that has a smallest quantity of terminals and that is in the multiple multicast groups whose states are multicast-to-unicast transmission.

In multicast-to-unicast transmission mode, a packet may not be easily lost, and packet transmission quality is relatively high. Therefore, when a multicast group whose original state is multicast-to-unicast transmission is set to multicast transmission, a multicast group that has a relatively small quantity of terminals is preferentially selected. This can ensure that a quantity of terminals in the multicast group whose state is multicast-to-unicast transmission is not significantly reduced, and overall packet transmission quality is relatively high.

Optionally, the first multicast group is a multicast group that has a largest quantity of terminals and that is in the multiple multicast groups whose states are multicast-to-unicast transmission.

Compared with multicast-to-unicast transmission, efficiency of multicast transmission is higher. When a quantity of packets in a packet cache queue is relatively large, a multicast group that has a relatively large quantity of terminals is preferentially selected, and a state of the multicast group is changed from multicast-to-unicast transmission to multicast transmission. This can quickly improve packet transmission efficiency.

The method may further include, when the packet amount in the packet cache queue is less than a second threshold, changing, by the AP, a state of a second multicast group to multicast-to-unicast transmission, where a state that is of the second multicast group and that is before the change is multicast transmission.

Optionally, that the packet amount in the packet cache queue is less than the second threshold may be that the quantity of the packets is less than the second threshold, or the quantity of the packets is less than or equal to the second threshold.

Optionally, after the changing, by the AP, a state of a second multicast group to multicast-to-unicast transmission in a second set, the method further includes receiving, by the AP, a second multicast packet, where a multicast group of the second multicast packet is the second multicast group; converting, by the AP, the second multicast packet into one or more unicast packets in WLAN format according to the state of the second multicast group, where a receiver address or receiver addresses of the one or more unicast packets in WLAN format is/are a MAC address or MAC addresses of one or more terminals in the second multicast group; adding, by the AP, the one or more unicast packets in WLAN format to the packet cache queue; and sending, by the AP, the one or more unicast packets in WLAN format that are in the packet cache queue.

Optionally, in an embodiment, when the to-be-sent multicast packet and the to-be-sent unicast packet are in different cache queues, after the packet amount in the packet cache queue is less than the second threshold, the method further includes, when receiving a fifth multicast packet in the second multicast group, converting, by the AP, the fifth multicast packet into one or more unicast packets, where a receiver address or receiver addresses of the one or more unicast packets is/are a MAC address or MAC addresses of one or more terminals in the second multicast group, and adding the fifth multicast packet to a temporary queue of the second multicast group; and when a quantity of packets in the second multicast group that are in the packet cache queue is 0, adding, by the AP, the fifth multicast packet in the temporary queue of the second multicast group to the packet cache queue according to the state of the second multicast group; or when receiving a fifth multicast packet in the second multicast group, adding, by the AP, the fifth multicast packet to a temporary queue of the second multicast group; and when a quantity of packets in the second multicast group that are in the packet cache queue is 0, converting, by the AP, the fifth multicast packet in the temporary queue of the second multicast group into one or more unicast packets according to the state of the second multicast group, where a receiver address or receiver addresses of the one or more unicast packets is/are a MAC address or MAC addresses of one or more terminals in the second multicast group, and adding the one or more unicast packets to the packet cache queue.

If there is a to-be-sent multicast packet in the second multicast group, in this case, the fifth multicast packet is sent in multicast-to-unicast transmission mode, and packet disordering may easily occur. Therefore, before the fifth multicast packet is added to the packet cache queue, it is required to determine that the quantity of the packets in the second multicast group that are in the packet cache queue is 0.

In a possible implementation, before the packet amount in the packet cache queue is less than the second threshold, the method further includes receiving, by the AP, a sixth multicast packet, where a multicast group of the sixth multicast packet is the second multicast group; adding, by the AP, the sixth multicast packet to the packet cache queue; and sending, by the AP, the sixth multicast packet in the packet cache queue.

Optionally, before the changing, by the AP, a state of a second multicast group to multicast-to-unicast transmission, the second multicast group is one of multiple multicast groups, and states of the multiple multicast groups are multicast transmission.

Optionally, the second multicast group is a multicast group that has a largest quantity of terminals and that is in multiple multicast groups whose states are multicast transmission.

In multicast-to-unicast transmission mode, a packet may not be easily lost, and packet transmission quality is relatively high. Therefore, when a multicast group whose original state is multicast transmission is set to multicast-to-unicast transmission, a multicast group that has a relatively large quantity of terminals is preferentially selected. This can ensure that a quantity of terminals in a multicast group whose state is multicast-to-unicast transmission significantly increases, overall packet transmission quality is greatly improved, and user experience is improved.

Optionally, the second multicast group is a multicast group that has a smallest quantity of terminals and that is in multiple multicast groups whose states are multicast transmission.

Compared with multicast-to-unicast transmission, efficiency of multicast transmission is higher. When a multicast group whose original state is multicast transmission is set to multicast-to-unicast transmission, a multicast group that has a relatively small quantity of terminals is preferentially selected. This can improve packet transmission quality while ensuring that packet transmission efficiency is relatively high.

Figure 2:
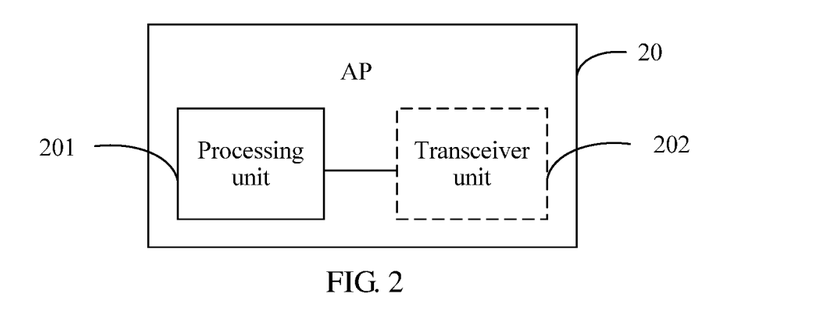
FIG. 2 is a schematic structural diagram of an AP according to an embodiment of this disclosure.

Based on the method for setting a packet transmission mode that is described in the foregoing embodiment corresponding to FIG. 1, an embodiment of this disclosure provides an AP. Referring to FIG. 2, the AP 20 includes a processing unit 201. Optionally, the AP 20 may further include a transceiver unit 202.

The processing unit 201 and the transceiver unit 202 are configured to perform the method for setting a packet transmission mode that is described in the foregoing embodiment corresponding to FIG. 1. For a specific implementation of the method for setting a packet transmission mode, refer to description in the embodiment corresponding to FIG. 1, and details are not described herein again.

Figure 3:
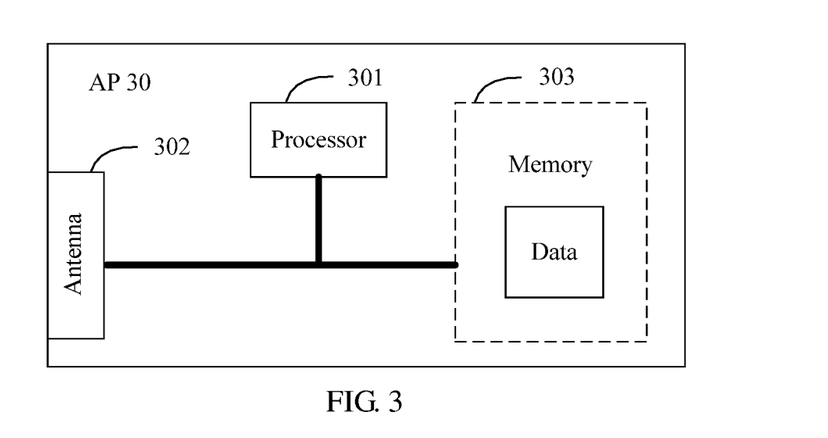
FIG. 3 is a schematic structural diagram of another AP according to an embodiment of this disclosure.

Based on the method for setting a packet transmission mode that is described in the foregoing embodiment corresponding to FIG. 1, an embodiment of this disclosure provides another AP. Referring to FIG. 3, the AP 30 includes a processor 301 and an antenna 302, where the processor 301 is connected to the antenna 302, and the antenna 302 is configured to send and receive signals. Optionally, the AP 30 may further include a memory 303, where the memory 303 is connected to the processor 301, and the memory 303 is configured to store data, or may be configured to store a program.

The processor 301 and the antenna 302 are configured to perform the method for setting a packet transmission mode that is described in the embodiment corresponding to FIG. 1. For a specific implementation of the method for setting a packet transmission mode, refer to description in the embodiment corresponding to FIG. 1, and details are not described herein again.

According to the AP provided in this embodiment of this disclosure, when a packet amount in a packet cache queue exceeds a first threshold, a state of a first multicast group is changed to multicast transmission, where a state that is of the first multicast group and that is before the change is multicast-to-unicast transmission. For a multicast group whose state is multicast-to-unicast transmission, an AP needs to replicate a packet to obtain multiple packets, and a relatively large quantity of CPU resources are consumed. In addition, the AP needs to separately send the multiple replicated packets to multiple terminals in the multicast group, and a relatively large quantity of air interface resources are further consumed. In multicast-to-unicast transmission mode, efficiency of sending a packet is relatively low, and a relatively large quantity of resources are consumed. In multicast transmission mode, the packet may be easily lost, and transmission quality is relatively low. When a quantity of packets in a packet cache queue is relatively large, a first multicast group whose original state is multicast-to-unicast transmission is set to multicast transmission. This can improve packet transmission efficiency while ensuring packet transmission quality.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

What is claimed is:

1. A method for setting a packet transmission mode, comprising:
changing, by an access point (AP), a state of a first multicast group to multicast transmission when a packet amount in a packet cache queue exceeds a first threshold, wherein the state that is of the first multicast group and that is before the change is multicast-to-unicast transmission;
adding, by the AP, a first multicast packet to a temporary queue of the first multicast group when receiving the first multicast packet in the first multicast group; and
adding, by the AP, the first multicast packet in the temporary queue of the first multicast group to the packet cache queue according to the state of the first multicast group when a quantity of packets in the first multicast group that are in the packet cache queue is zero.

2. The method of claim 1, wherein before changing, by the AP, the state of the first multicast group to multicast transmission, the first multicast group is one of multiple multicast groups, and wherein states of the multiple multicast groups are multicast-to-unicast transmission.

3. The method of claim 1, wherein after changing, by the AP, the state of the first multicast group to multicast transmission, the method further comprises:
receiving, by the AP, the first multicast packet, wherein a multicast group of the first multicast packet is the first multicast group;
adding, by the AP, the first multicast packet to the packet cache queue; and
sending, by the AP, the first multicast packet in the packet cache queue.

4. The method a claim 1, further comprising changing, by the AP, a state of a second multicast group to multicast-to-unicast transmission when the packet amount in the packet cache queue is less than a second threshold, wherein the state that is of the second multicast group and that is before the Change is multicast transmission.

5. An access point (AP), comprising:
a memory storing executable instructions; and
a processor coupled to the memory and configured to:
change a state of a first multicast group to multicast transmission when a packet amount in a packet cache queue exceeds a first threshold, wherein a state that is of the first multicast group and that is before the change is multicast-to-unicast transmission;
add a first multicast packet to a temporary queue of the first multicast group when the first multicast packet in the first multicast group is received; and
add the first multicast packet in the temporary queue of the first multicast group to the packet cache queue according to the state of the first multicast group when a quantity of packets in the first multicast group that are in the packet cache queue is zero.

6. The AP of claim 5, wherein before the processor changes the state of the first multicast group to multicast transmission, the first multicast group is one of multiple multicast groups, and wherein states of the multiple multicast groups are multicast-to-unicast transmission.

7. The AP of claim 5, further comprising a transceiver coupled to the processor and configured to receive the first multicast packet, wherein a multicast group of the first multicast packet is the first multicast group, wherein the processor is further configured to add the first multicast packet to the packet cache queue, and wherein the transceiver is further configured to send the first multicast packet in the packet cache queue.

8. The AP of claim 5, wherein the processor is further configured to change a state of a second multicast group to multicast-to-unicast transmission when the packet amount in the packet cache queue is less than a second threshold, and wherein the state that is of the second multicast group and that is before the change is multicast transmission.

9. An access point (AP), comprising:
an antenna configured to send and receive signals; and
a processor coupled to the antenna and configured to:
change a state of a first multicast group to multicast transmission when a packet amount in a packet cache queue exceeds a first threshold, wherein a state that is of the first multicast group and that is before the change is multicast-to-unicast transmission;
add a first multicast packet to a temporary queue of the first multicast group after the packet amount in the packet cache queue exceeds the first threshold and when receiving the first multicast packet in the first multicast group; and
add the first multicast packet in the temporary queue of the first multicast group to the packet cache queue according to the state of the first multicast group when a quantity of packets in the first multicast group that are in the packet cache queue is zero.

10. The AP of claim 9, wherein before the state of the first multicast group is changed to multicast transmission, the first multicast group is one of multiple multicast groups, and wherein states of the multiple multicast groups are multicast-to-unicast transmission.

11. The AP of claim 9, wherein the processor is further configured to:
receive the first multicast packet using the antenna after changing the state of the first multicast group to multicast transmission, wherein a multicast group of the first multicast packet is the first multicast group;
add the first multicast packet to the packet cache queue; and
send the first multicast packet in the packet cache queue using the antenna.

12. The AP of claim 9, wherein the processor is further configured to change a state of a second multicast group to multicast-to-unicast transmission when the packet amount in the packet cache queue is less than a second threshold, and wherein the state that is of the second multicast group and that is before the change is multicast transmission.

* * * * *